United States Patent Office 2,921,954
Patented Jan. 19, 1960

2,921,954

NOVEL VINYL BORONS AND METHOD OF PREPARATION

Hugh E. Ramsden, Scotch Plains, N.J., assignor to Metal & Thermit Corporation, Woodbridge Township, Middlesex County, N.J., a corporation of New Jersey No Drawing. Application July 12, 1957
Serial No. 671,377

12 Claims. (Cl. 260—462)

The present invention relates to a novel process for preparing vinylicboron compounds. It has now been discovered that vinylicboron compounds can be prepared by a novel, efficient and economical process. This application is a continuation-in-part of application Serial No. 549,571, filed November 28, 1955, which in turn is a continuation-in-part of application Serial No. 520,145, filed July 5, 1955, both now abandoned.

It is an object of this invention to provide a novel process for preparing vinylicboron compounds.

Generally speaking, the vinylicboron compounds that may be prepared by the process of this invention have the general formula:

(1)           $Vi_nR_aR'_bBX_{3-(n+a+b)}$ wherein $n=1$, 2 or 3; $a$ and $b=0$ or 1; $n+a+b$ may not total more than 3; Vi is a vinylic radical; R and R' may be the same or different and are selected from the group consisting of alkyl, cycloalkyl, alkandiyl, cycloalkandiyl, alkenyl, alkadienyl, cycloalkenyl, alkynyl, cycloalkadienyl, aryl, aralkyl, and active-hydrogen-free heterocyclic radicals, and X is selected from the group consisting of iodine, bromine, chlorine, fluorine, alkoxy and aryloxy radicals. Two or more R groups may be cyclized. The aryl radicals include fused ring and condensed radicals. The term "vinylic radical" (Vi) is used herein to denote structures of the type:

(2) 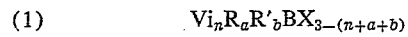

where the No. 1 carbon is bonded to boron R", R''' and R'''' may be hydrogen and are further defined as is R above. The hydrocarbon radicals may be unsubstituted or carry functional groups inert to magnesium or vinylic magnesium chlorides under reaction conditions. The vinylic radical also includes cycloalkenyls having the following general type structure:

(3) 

where $l$ is a whole number greater than 1. By the term "active-hydrogen-free heterocyclic radical," all heterocyclic radicals except those containing hydrogen attached to nitrogen, or containing other groups reactive with the organic magnesium chlorides, are included.

More specifically compounds that may be prepared by the process of the present invention may be described by the general formula (3a)         $Vi_nR_aR'_bBX_{3-(n+a+b)}$ where $n$ is a whole number from 1 to 3, $a$ and $b$ are whole numbers from 0 to 2, wherein the sum of $n+a+b$ does not exceed 3; X is selected from the class consisting of iodine, bromine, chlorine, fluorine; an alkoxy radical having up to 30 carbon atoms in the alkyl chain and an aryloxy radical having up to 3 rings in the aryl radical; R is a radical selected from the class consisting of alkyl having up to 30 carbon atoms in the alkyl chain, aryl radical having up to 3 rings in the aryl radical and no more than 48 carbon atoms in the radical, cycloalkyl radicals having up to 8 carbon atoms in the cycloalkyl ring; heterocyclic radicals containing up to 3 rings in the radical and no more than 48 carbon atoms in the radical and containing as the heterocyclic atoms only elements selected from the class consisting of oxygen, sulfur and nitrogen; R' has the same values ascribed above for R with the further stipulation that it may comprise a divalent aliphatic hydrocarbon radical, containing no more than 6 carbon atoms in the chain, each valence of which is bonded to B; and Vi is a vinylic radical having from 2 to 30 carbon atoms in the radicals and having the following structural formula (3b) 

wherein no more than 2 valence bonds indicated by the dotted lines in the above formula are bonded to the $C_2$ atom, and no more than 1 valence bond indicated by the dotted line, in said formula is bonded to the $C_1$ atom, wherein $R^2$, $R^3$ and $R^4$ are monovalent hydrocarbon groups having up to 28 carbon atoms, and $R^5$ is a divalent saturated aliphatic hydrocarbon radical having from 3 to 8 carbon atoms in the chain, and $a$, $b$, $c$, and $d$ are whole numbers from zero to 1, wherein the sum of $a+b+c+d$ is a whole number from 2 to 3, and wherein when $b$ equals zero the sum of $a+c+d$ equals 3, and wherein when $b$ equals 1 the sum of $a+b+c+d$ equals 2, and wherein when any of the subscripts $a$, $c$ and $d$ are zero a hydrogen replaces the corresponding radical in the formula.

The process of this invention comprises reacting a vinylicmagnesium chloride with a compound selected from the class consisting of organoboron halides, boron trihalides, alkylborates or arylborates, to produce vinyliccontaining boron compounds in accordance with the following equation:

(4)   $nViMgCl + Vi_dR_aR'_bBX_{3-(d+a+b)}$
                        $\rightarrow Vi_nR_aR'_bBX_{3-(n+a+b)} + MgClX$ wherein $n=1$, 2 or 3; $d=0$, 1 or 2; $a$ and $b=0$ or 1; $d+a+b$ may not be greater than 2; $n+a+b$ may not be greater than 3; Vi and X have the same significance ascribed to them above; R and R' are the same or different and have the same meaning given to them above. The following type compounds are the products included within the general formula for the vinylic product above: $Vi_3B$, $Vi_2RB$, $Vi_2BX$, $ViRR'B$, $ViRBX$, $ViBX_2$. As illustrated in the foregoing Equation 4, the boron reactant may contain one or two vinylic groups bonded to the boron atom. If so, said reactant was also made in accordance with the present process.

An aspect of the present process is illustrated in the following equation:

(5)   $nViMgCl + R_aR'_bBX_{3-(a+b)}$
                      $\rightarrow Vi_nR_aR'_bBX_{3-(n+a+b)} + nMgClX$ wherein $n=1$, 2, or 3; $a$ and $b=0$ or 1; the sum of $n+a+b$ being not greater than 3; the sum of $a+b$ may not be greater than 2; Vi and X have the same significance ascribed to them above; and R and R' are the same or different and have the same meaning ascribed to them above. The process may be so controlled that any of the aforementioned products or a mixture of products may be produced. It is also possible to carry out the reaction stepwise by first reacting a vinylicmagnesium chloride with an organoboron halide not containing vinylic radicals or with boron trihalide, or with the corresponding alkyl or arylborates and then further reacting the product of this reaction with a vinylicmagnesium chloride as is included in Equation 4 herein.

The vinylicboron compounds may also be prepared by reacting a vinylicboron halide, alkoxy or aryloxy compounds containing at least one vinylic group bonded to the boron atom with an organomagnesium halide (preferably the chloride). Thus, diphenylvinylborine may be produced by reacting vinylboron dichloride with phenylmagnesium chloride. Of course, the vinylboron halide utilized as a reactant is produced by the process of this invention, as illustrated in Equation 4. The use of this two-step procedure is advantageous in certain cases where it will result in mixtures of reaction products and reactants which are most easily separated than would be mixtures resulting from the one step process illustrated in Equation 4.

When the vinylicmagnesium chloride is reacted with the boron reactant, the product may be any of the type compounds listed herein before (as products) or any mixture of them, dependent upon the reactants used, the relative proportions of the reactants used, and the process conditions. The reaction product will usually be a mixture of 2 or 3 of the above products. However, by control of the variables, it is possible to produce a product containing a preponderance of a desired reaction product. A single product may be obtained when using a mono-halogen boron, a monoalkoxy or a monoaryloxy boron compound as the reactant or a sufficient excess of ViMgCl with $BX_3$, $RBX_2$, $R_2BX$ to give $Vi_3B$, $Vi_2RB$ and $ViR_2B$, respectively.

The process is usually carried out by dissolving the boron containing reactant in an organic solvent. Vinylic magnesium chloride (usually in a solution of cyclic ether, Q, more particularly hereinafter defined) is added to the solution of boron reactant preferably with agitation. A reaction will usually start immediately. If all of the halogen, alkoxy or aryloxy is to be replaced, the boron reactant may be added to the vinylicmagnesium chloride solution.

The process of the present invention may be carried over a wide temperature range. The limits of the temperature range are governed by the freezing point and refluxing, temperatures of the reaction mixture and the stability of the product. Thus, for example, the reaction of the present process may be carried out over a range of $-40°$ C. to the boiling point of the solvent system employed as reaction medium. However, for the optimum production of various products certain temperature ranges are most suitable. Thus, for example, the triunsymmetrically substituted vinylicboron compounds are best prepared at temperatures at the lower end of the temperature range. The vinylicboron dichlorides and divinylicboron chlorides are best prepared at a somewhat higher temperature which may approach as high as room temperature. The trivinylicboron compounds are best prepared at a temperature between $0°$ C. and $10°$ C. although temperatures as high as the boiling point of the solvent employed may be used. The preferred temperature range for carrying out the process of this invention is from about $-40°$ C. to about $+10°$ C.

The reaction is preferably carried out in an inert atmosphere, usually nitrogen. The reaction products include one or more of the vinylicboron compounds and a magnesium halide salt cake which may be separated by conventional means, e.g., filtration, drowning in and extraction by acidified water, crystallization, etc. The solvents are usually removed by distillation. When the products include more than one vinylicboron compound, they may be separated by conventional separatory techniques.

The vinylicmagnesium chlorides are prepared as disclosed in U.S. patent application No. 549,517, filed November 28, 1955, now abandoned.

Compound Q referred to above is a substituted or unsubstituted non-aromatic heterocyclic oxygen compound having from 5 to 6 atoms in the heterocyclic ring, and only one oxygen in said heterocyclic ring. The other ring atoms of said heterocyclic ring are carbon with the exception that a substituted ring nitrogen, substituted preferably with an alkyl radical having up to 6 carbon atoms in the alkyl chain, may replace a carbon atom in said heterocyclic ring which is not adjacent said oxygen atom in the ring. A further requirement for compound Q is that said heterocyclic ring is of a non-aromatic character, that is, that it does not contain a cyclic conjugated system of bonding within the heterocyclic ring. Preferably, said compound Q contains not more than one unsaturation between carbon atoms of said heterocyclic ring, which is an ethylenic unsaturation. A further requirement for compound Q is that it be unsubstituted, except for hydrogen at at least one carbon atom which is adjacent said oxygen atom in said heterocyclic ring. The heterocyclic ring of compound Q may carry any substitutents which are not reactive with the reactants and the reaction products, under the conditions of reaction, for the preparation of the vinylicmagnesium chloride. By way of illustration the following substituents may be mentioned: alkyl, aryl, alkoxy, aryloxy; $-CH_2OR''$ wherein $R''$ is alkyl, preferably having up to 6 carbon atoms or $-(CH_2-CH_2-O)_xR'''$ wherein $x$ is a whole number from 1 to 8 and $R'''$ is alkyl, preferably having up to 6 carbon atoms;

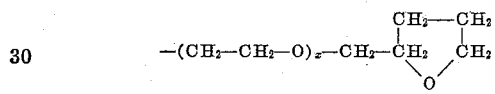

wherein $x$ is a whole number from 1 to 8; and

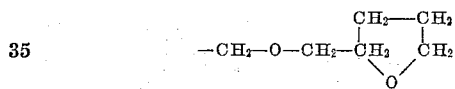

In a preferred form of this invention the substituents on said compound Q, aside from hydrogen, occur only at the number 2 position of said non-aromatic heterocyclic ring system and do not contain more than 75 atoms in the group.

Q may function as a solvent in this present process. If it is used as a solvent, a high melting point (e.g., about $90°$ C.), will cause difficulty in carrying out the reaction. For this reason it is advantageous to use a liquid Q, i.e., liquid below $90°$ C.

It will be noted from the above that an essential feature of the compound Q is that it be non-aromatic in character. Another essential feature of compound Q is that it be free of substituents except for hydrogen, at at least one carbon atom which is adjacent the oxygen atom of the heterocyclic ring. These features are essential in order to make the free p-electrons on said oxygen atom available for coordination and complex formation with magnesium. The presence of substituents, aside from hydrogen, on both carbon atoms adjacent the oxygen atom of said heterocyclic ring restricts the availability of the free p-electrons of said oxygen for donation and complex formation, whereas a substituent on only one of said carbon atoms does not. The presence of substituents in other positions on the heterocyclic ring does not affect the availability of electrons on said oxygen for coordination and complex formation. The free p-electrons on oxygen atoms which constitute part of a heterocyclic ring system possessing aromatic characteristics are also not available for coordination and complex formation. The "aromaticity" of certain heterocyclic compounds is a well known phenomena. This phenomenon is associated with the cyclic conjugated system of bonding which is characteristic of these heterocyclic compounds. Thus, furan, which is known to be aromatic in character, is not operative as a compound Q, whereas dihydropyran, which contains a single unsaturated bond is operative as a compound Q for the purposes of this invention. This is explained on the basis of the resonance of the respective compounds. Furan exhibits a p-pi aromatic resonance as a result of which the electron distribution is such that the free p-electrons of the oxygen atom are not available for coordination and complex formation. Dihydropyran, on the other hand exhibits only an ethylenic p-pi resonance in which the free p-electrons are still available for coordination and complex formation thus rendering it operative for the present purpose.

By way of illustration heterocyclic oxygen compounds included within the definition of compound Q are as follows: tetrahydrofuran, tetrahydropyran, 2-methyltetrahydrofuran, tetrahydrofurfuryl ethyl ether, dihydropyran, N-methylmorpholine, ditetrahydrofurfuryl ether and ethers of general formula

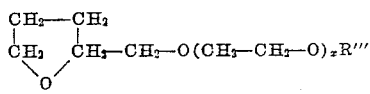

wherein R''' is an alkyl group having from 1 to 6 carbon atoms in the alkyl radical or the group

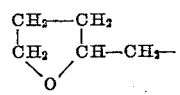

and $x$ is a whole number from 1 to 8.

In a preferred form of this invention the vinylic-magnesium chloride is employed in the form of a solution in compound Q. This is preferred since this reagent may be readily and economically prepared by the reaction of the vinylic chloride with magnesium in the presence of compound Q. The solutions thus prepared may be used as a reactant in the present process. However, the vinylicmagnesium chloride may also be used in the process of the present invention when dissolved in other inert solvents, e.g., ethylene polyethers, heptane, cyclohexane, toluene, etc. These solutions are prepared by the displacement of compound Q from solutions of the vinylic magnesium chlorides—compound Q solutions by the above mentioned inert solvents. The vinylic magnesium chloride may also be used in accordance with this invention in the form of a solution in a mixture of compound Q and an inert solvent mentioned supra.

The solvents utilized in the process must be inert to other components of the reaction mixture under the process conditions and are preferably organic solvents that distill below 150° C. The preferred solvents include substituted and unsubstituted tetrahydrofuran, tetrahydropyran, heptane, hexane, pentane, cyclohexane, octane, isooctane, cumene, xylene, toluene, benzene, etc. As noted above, a solvent system containing more than one component may also be used. A preferred solvent system is that containing tetrahydrofuran and a hydrocarbon solvent, e.g., saturated aliphatic, saturated cyclic aliphatic or aromatic solvent. Almost all of the reaction mixtures utilized will contain tetrahydrofuran or an equivalent material, designated as compound Q, complexed with the vinylicmagnesium chloride.

The following examples are further illustrative of the present invention.

*Example No. 1*

Vinylboron dichloride $(CH_2=CH)BCl_2$

A solution containing 1 mole of vinylmagnesium chloride in tetrahydrofuran is introduced to exactly 1 mole of boron trichloride in hexane. The reaction vessel is fitted with a refluxing condenser cooled with Dry Ice/acetone bath. During the addition of the boron trichloride, the reaction mixture is vigorously stirred and maintained at a temperature of 0°-12° C. After the addition is complete, the reaction mixture is permitted to sit overnight at a temperature of 4° C. Vinylboron dichloride results, accompanied with divinylboron chloride and some trivinylboron.

*Example No. 2*

Vinyldimethylboron $(CH_2=CH)(CH_3)_2B$

To a solution containing 1 mole of vinylboron dichloride (as prepared in Example No. 1) in tetrahydrofuran is added slightly more than 2 moles of a solution of methylmagnesium chloride in tetrahydrofuran, the temperature throughout the addition being maintained at −40° to −30° C. After the addition is complete, the reaction mixture is vigorously stirred for a period of 2 hours. The vinyldimethylboron which results is accompanied by some trimethylboron and some trivinylboron. The latter two compounds result from the disproportionation of the vinyldimethylboron.

*Example No. 3*

Propenylboron dichloride $(CH_3CH=CH)BCl_2$

A solution of propenylmagnesium chloride in tetrahydropyran (1 mole) is introduced to exactly 1 mole of boron trichloride in hexane, while the temperature is maintained at 0°-6° C. After the addition is complete, the reaction vessel is permitted to sit for 45 minutes at about 0° C. and the propenylboron dichloride is isolated.

*Example No. 4*

Vinyldiethylboron $(CH_2=CH)(C_2H_5)_2B$

To 1 mole of vinylboron dichloride, prepared as in Example No. 1, dissolved in 2-methyltetrahydrofuran is added a solution containing 2 moles of ethylmagnesium chloride in 2-methyltetrahydrofuran, dropwise, over a period of 1½ hours while the temperature is maintained at −40° to −35° C. After the addition, the reaction mixture is permitted to stand overnight at −40° C. and vinyldiethylboron is isolated. As a result of the disproportionation of the product some trivinylboron and some triethylboron is also obtained.

*Example No. 5*

Cyclohexenylboron diphenoxide [(CH$_2$)$_4$—CH=C]B(OC$_6$H$_5$)$_2$

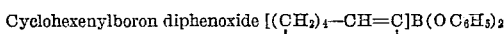

A solution containing 1 mole of the Grignard formed from cyclohexenyl chloride in tetrahydrofurfuryl ethyl ether is prepared. This solution is added exactly 1 mole of triphenyl borate in tetrahydrofurfuryl ethyl ether. During the addition, the reaction temperature is kept at 0° C. Stirring is continued for 3 hours while the mixture is also maintained at 0° C. Isolation of cyclohexenylboron diphenoxide is accompanied by the formation of some tricyclohexenylboron and some dicyclohexenylboron phenoxide.

*Example No. 6*

Cyclohexenyldipentachlorophenylboron [(CH$_2$)$_4$—CH=C](Cl$_5$C$_6$)$_2$B

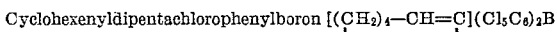

To 2 moles of pentachlorophenylmagnesium chloride in tetrahydrofurfuryl ethyl ether is added slowly 1 mole of cyclohexenylboron diphenoxide (as prepared in Example No. 5) in tetrahydrofurfuryl ethyl ether. The reaction is cooled so that the temperature during the addition is between −40° to −35° C. When the addition is complete stirring is continued and the temperature maintained at −35° C. for a period of 4 hours. In addition to the product, some tricyclohexenylboron and some trispentachlorophenylboron is obtained as a result of the disproportionation of the product.

*Example No. 7*

Divinylboron methoxide $(CH_2=CH)_2B(OCH_3)$

To a solution of trimethyl borate (1 mole) in tetrahydrofuran is added a separately prepared solution containing 2 moles of vinylmagnesium chloride in tetrahydrofuran. The addition is done slowly and cooling is applied to keep the reaction mixture at 0°-5° C. After 2 hours of stirring, divinylboron methoxide is isolated, in addition to some trivinylboron.

*Example No. 8*

Divinylboron chloride $(CH_2=CH)_2BCl$

A solution containing exactly 2 moles of vinylmagnesium chloride in tetrahydrofuran is added to exactly 1 mole of boron trichloride in tetrahydrofuran. During the addition of the boron trichloride, the reaction mixture is maintained at a temperature of 0°–12° C. After the addition is complete, the reaction mixture is permitted to set overnight at a temperature of 4° C. The divinylboron chloride is accompanied by the formation of some trivinylboron.

*Example No. 9*

Divinylmethylboron $(CH_2=CH)_2CH_3B$

To 1 mole of divinylboron methoxide, as prepared in Example No. 7, dissolved in 2-ethoxytetrahydropyran is added 1 mole of methylmagnesium chloride in 2-methyltetrahydrofuran. The temperature during the addition is kept at —40° to —35° C. Stirring is continued after the addition for a period of 3 hours, while the temperature is kept at —30° C. The divinylmethylboron is accompanied by the formation of some trivinylboron and some trimethylboron as a result of disproportionation.

*Example No. 10*

Divinylethylboron $(CH_2=CH)_2(C_2H_5)B$

This product is prepared by following the procedure shown in Example No. 9 except that ethylmagnesium chloride is used in place of methylmagnesium chloride. Some trivinylboron and some triethylboron, formed as a result of the disproportionation of the product, is also isolated.

*Example No. 11*

Trivinylboron $(CH_2=CH)_3B$

Trivinylboron is prepared by the following methods:
(*a*) To 3 moles of vinylmagnesium chloride dissolved in tetrahydrofuran is added slowly boron trichloride (1 mole) in tetrahydrofuran while the temperature is maintained at 0° to 5° C. After the addition is complete, the reaction mixture is stirred for a period of 3 hours while the temperature is maintained at 0° C. Trivinylboron is isolated.
(*b*) To 3 moles of a solution of vinylmagnesium chloride in tetrahydrofuran is added 1 mole of trimethylborate in tetrahydrofuran, while the temperature is maintained at 0° C. and the reaction mixture kept at this temperature for a period of 3 hours after the addition is complete. The pure product is then isolated.
(*c*) By following the method described in (*a*) above except that boron trifluoride is used.
(*d*) By following the methods described in (*a*), (*b*) (*c*) above except that tetrahydropyran, 2-methyltetrahydrofuran, tetrahydrofurfuryl ethyl ether or dihydropyran are used as solvents.

*Example No. 12*

Dicyclohexenylboron chloride $[(CH_2)_4CH=C]_2BCl$

This material is prepared following the procedure shown in Example No. 8, however 2 moles of the Grignard formed from 1-chloro-1-cyclohexene is used.

*Example No. 13*

Dicyclohexenyldodecylboron $[(CH_2)_4CH=C]_2[CH_3(CH_2)_{11}]B$

To a solution containing 1 mole of dicyclohexenylboron chloride (as prepared in Example No. 12) in tetrahydrofuran at —40° C. is added a separately prepared solution of 1 mole of dodecylmagnesium chloride in tetrahydrofuran. After the addition is complete, the solution is kept at —40° C. for a period of 12 hours and the product isolated. Some tricyclohexenylboron and some tridodecylboron also forms as a result of the disproportionation of the product.

*Example No. 14*

Vinylboron dibromide $(CH_2=CH)BBr_2$

This material is prepared following the procedure of Example No. 1, except that boron trichloride is replaced by boron tribromide.

*Example No. 15*

Vinyldi-$\beta$-naphthylboron $(CH_2=CH)(\beta\text{—}C_{10}H_7)_2B$

To a solution of 1 mole of vinylboron dibromide (prepared as in Example No. 14), chilled to a temperature of —40° C., is added a solution of 2 moles of $\beta$-naphthylmagnesium chloride in tetrahydrofuran, while the temperature throughout the addition is maintained at —40° C. The reaction mixture is kept at —40° C. for a period of 6 hours and the product then isolated. In addition to the product, some trivinylboron and some tri-$\beta$-naphthylboron is also isolated.

*Example No. 16*

Divinylboron phenoxide $(CH_2=CH)_2BOC_6H_5$

This product is made by following the procedure shown in Example No. 7, except that triphenyl borate is used instead of trimethyl borate.

*Example No. 17*

Divinylallylboron $(CH_2=CH)_2(CH_2=CHCH_2)B$

To divinylboron phenoxide, 1 mole, in tetrahydrofuran (prepared as in Example No. 16 and kept at —40° C.) is added a solution of exactly 1 mole of allylmagnesium chloride prepared in tetrahydrofuran. Cooling is applied to the reaction mixture to keep the temperature at —40° C. during the time of addition and for a period of 4 hours thereafter. Isolation affords the product as well as some trivinylboron and some triallylboron.

*Example No. 18*

Vinylcyclohexenylboron chloride $(CH_2=CH)[(CH_2)_4\text{—}CH=C]BCl$

To 1 mole of vinylboron dichloride in tetrahydrofuran (as prepared in Example No. 1) is added exactly 1 mole of the Grignard formed from 1-chloro-1-cyclohexene in tetrahydrofuran. The temperature during the addition and for 3 hours afterwards is maintained at —40° C. In addition to the product, some vinyldicyclohexenylboron is isolated.

*Example No. 19*

Vinylboron dimethoxide $(CH_2=CH)B(OCH_3)_2$

To a solution of trimethyl borate (1 mole) in tetrahydrofuran is added a separately prepared solution containing 2 moles of vinylmagnesium chloride in tetrahydrofuran. The addition is done slowly and cooling is applied to keep the reaction mixture at 0°–5° C. After 2 hours of stirring, vinylboron dimethoxide is isolated, in addition to some divinylboron methoxide and some trivinylboron.

*Example No. 20*

Vinylcyclohexenylboron methoxide $$(CH_2=CH)[(CH_2)_4\text{—}CH=C]BOCH_3$$

To 1 mole of vinylboron dimethoxide (as prepared in Example No. 19) in tetrahydrofuran and at —40° C. is added 1 mole of 1-cyclohexenylmagnesium chloride in tetrahydrofuran. The reaction mixture is allowed to sit at —40° C. for 4 hours and the product isolated. Some vinyldicyclohexenylboron also is formed.

Example No. 21

Vinylcyclohexenyl-p-anisylboron $(CH_2=CH)[(CH_2)_4-CH=C][CH_3OC_6H_4]B$

The Grignard formed from p-anisyl chloride (1 mole) in tetrahydrofuran is added to 1 mole of vinylcyclohexenylboron methoxide (as prepared in Example No. 20) in tetrahydrofuran while the temperature is kept at —40° C. during the addition and the reaction mixture then stirred for 6 hours at —40° C. As a result of the disproportionation of the product, some trivinylboron, some tri-1-cyclohexenylboron and some tri-p-anisylboron is also formed.

Example No. 22

Divinyl-α-styrylboron $(CH_2=CH)_2(C_6H_5-C=CH_2)B$

The Grignard prepared from α-styryl chloride (1 mole) in tetrahydrofuran is added to a chilled solution of divinylboron methoxide (as prepared in Example 7) in tetrahydrofuran maintained at —40° C., and the resultant mixture is kept at —40° C. for a further 4 hours. The product is isolated in addition to some trivinylboron and some tri-α-styrylboron.

Example No. 22A

Di-1-butenylboron chloride $(CH_3CH_2CH=CH)_2BCl$

This product is prepared following the procedure shown in Example No. 8, except that 2 moles of the Grignard prepared from 1-chloro-1-butene is used. Some tri-1-butenylboron is also formed.

Example No. 23

Propenyldibenzylboron $(CH_3CH=CH)(C_6H_5CH_2)_2B$

To 1 mole of propenylboron dichloride (as prepared in Example No. 3) in tetrahydrofuran is added 2 moles of the Grignard formed from benzyl chloride in tetrahydrofuran at —40° C. The reaction mixture is permitted to sit at —40° C. for a further 2 hours. Some tripropenylboron and some tribenzylboron is isolated as a result of the disproportionation of the product.

Example No 24

Vinyldihexylboron $(CH_2=CH)(n-C_6H_{13})_2B$

This product is prepared by following the procedure in Example 2, except that the Grignard from n-hexyl chloride is used. Some trivinylboron and some tri-n-hexylboron also results.

Example No. 25

Vinyl-α-naphthylboron chloride
$(CH_2=CH)(\alpha-C_{10}H_7)BCl$

To 1 mole of vinylboron dichloride (as prepared in Example No. 1) in tetrahydrofuran is added exactly 1 mole of α-naphthylmagnesium chloride at —40° C. The reaction mixture is stirred while the temperature is maintained at —40° C. for a period of 2 hours after the addition is complete. In addition to the product, some vinyldi-α-naphthylboron is also isolated.

Example No. 26

Vinyl-α-naphthyloctadecylboron
$(CH_2=CH)(\alpha-C_{10}H_7)(C_{18}H_{37})B$

To vinyl-α-naphthylboron chloride (1 mole), prepared as shown in Example No. 25 and in tetrahydrofuran, is added a solution of the Grignard formed from 1-chlorooctadecane in tetrahydrofuran while the temperature is maintained at —40° C. to —35° C. throughout the period of addition and for 2 hours therafter. In addition to the product, some trivinylboron, some tri-α-naphthylboron and some trioctadecylboron is formed.

Example No. 27

Divinyldodecylboron $(CH_2=CH)_2(C_{12}H_{25})B$

This product is made by following the procedure described in Example No. 10, except that dodecylmagnesium chloride is used.

Example No. 28

Vinyldicyclohexylboron $(CH_2=CH)[CH_2(CH_2)_4-CH]_2B$

This product is made by following the procedure shown in Example 2, except that the Grignard formed from chlorocyclohexane is used.

Example No. 29

Divinylphenethylboron $(CH_2=CH)_2(C_6H_5CH_2CH_2)B$

This product is made by following the procedure shown in Example No. 9. However, the Grignard formed from 2-chloroethylbenzene is used. Some trivinylboron and some triphenethylboron also are formed.

Example No. 30

Vinylpropenylboron chloride $(CH_2=CH)(CH_3CH=CH)BCl$

This product is obtained by folowing the procedure shown in Example No. 18, except that the Grignard formed from 1-chloro-1-propene is used. The product is accompanied by the formation of some vinyldipropenylboron.

Example No. 31

Vinylboron diphenoxide $(CH_2=CH)B(OC_6H_5)_2$

This product is prepared by following the procedure shown in Example No. 19, except that triphenyl borate is used. The product is accompanied by the formation of some divinylboron phenoxide and some trivinylboron.

Example No. 32

Tripropenylboron $(CH_3CH=CH)_3B$

The product here is prepared by following the procedures shown in Example No. 11, except that the Grignard formed from 1-chloro-1-propene is used.

Example No. 33

Tri-1-butenylboron $(CH_3CH_2CH=CH)_3B$

The product here is formed by following the procedures in Example No. 11, except that the Grignard formed from 1-chloro-1-butene is used.

Example No. 33A

Tri-2-(butenyl-2)-boron $(CH_3CH=C-CH_3)_3B$

The product here is formed by following the procedures in Example No. 11, except that the Grignard formed from 2-chloro-2-butene is used.

Example No. 34

Tri-1-cyclohexenylboron $[(CH_2)_4-CH=C]_3B$

The product is prepared by following the procedures in Example No. 11, except that the Grignard formed from 1-chloro-1-cyclohexene is used.

Example No. 34A

Trimethyl borate (0.33 mole) in tetrahydrofuran is added slowly with stirring (and cooling to range of 0° C. to 10° C.) to 1-cyclohexenylmagnesium chloride complex in tetrahydrofuran. Tris-1-cyclohexenylboron results, accompanied by cyclohexenylboron di-methoxide and bis-cyclohexenylboron methoxide.

Example No. 35

Divinylphenylboron $(CH_2=CH)_2C_6H_5B$

This product is prepared by following the procedure shown in Example No. 10, except that the Grignard formed from chlorobenzene is used. The product is accompanied by the formation of some trivinylboron and some triphenylboron as a result of disproportionation.

*Example No. 36*

1-butenylboron dimethoxide $$(CH_3CH_2CH{=}CH)B(OCH_3)_2$$

This product is prepared by following the procedure shown in Example No. 10, except that the Grignard formed from 1-chloro-1-butene is used.

*Example No. 37*

Butenyldi-n-butylboron $(CH_3CH_2CH{=}CH)(n{-}C_4H_9)_2B$

To 1 mole of 1-butenylboron dimethoxide in tetrahydrofuran (as prepared in Example No. 36) is added 2 moles of n-butylmagnesium chloride at −40° C. After keeping the reaction mixture at −40° C. for 3 hours, the product is isolated, in addition to some tri-1-butenylboron and some tri-n-butylboron.

*Example No. 38*

Propenylboron diethoxide $(CH_3CH{=}CH)B(OC_2H_5)_2$

Triethyl borate (1 mole) in tetrahydrofuran is slowly added to a solution of propenylmagnesium chloride (1 mole) in tetrahydrofuran at −30° C. and the reaction mixture kept at that temperature for 2 hours. In addition to the product, some dipropenylboron ethoxide and some tripropenylboron is isolated.

*Example No. 39*

Propenyl-1-butenylboron ethoxide
$$(CH_3CH{=}CH)(CH_3CH_2CH{=}CH)BOC_2H_5$$

To a solution of exactly 1 mole of propenylboron diethoxide in tetrahydrofuran (as prepared in Example No. 38) and kept at −40° C. is added exactly 1 mole of the Grignard formed from 1-chloro-1-butene. The reaction mixture is kept at −40° C. for 2 hours and then the product isolated. Along with the product, some propenyldi-1-butenylboron, some tripropenylboron and some tri-1-butenylboron is isolated.

*Example No. 40*

Vinylpropenyl-1-butenyl-1-boron $(CH_2{=}CH)$
$$(CH_3CH_2CH{=}CH)(CH_3CH{=}CH)B$$

To a solution containing 1 mole of propenyl-1-butenyl-1-boron ethoxide in tetrahydrofuran (as prepared in Example No. 39 and kept at −40° C.) is added exactly 1 mole of vinylmagnesium chloride in tetrahydrofuran. The reaction mixture is kept at −40° C. for 3 hours and then the product is isolated. There is formed, along with the product, some trivinylboron, some tripropenylboron and some tri-1-butenylboron as a result of disproportionation.

*Example No. 41*

Vinyl-di-(p-dimethylaminophenyl)boron
$$(CH_2{=}CH)[(CH_3)_2NC_6H_4]_2B$$

This product is prepared by following the procedure shown in Example No. 2, except that the Grignard formed from p-dimethylaminochlorobenzene is used.

The vinylicboron compounds of this invention are polyfunctional in character and are active as cross linking agents. They may be polymerized with such compounds as styrene, vinyl acetate, vinyl chloride, butadiene, acrylates, esters, acrylics and other vinylated metals or metalloids such as vinyltins, vinylsilanes, vinylarsenic and vinylantimony to yield polymers having a high metal or metalloid content which may be used in the plastic fabricating industries as well as in other industries.

Throughout the application the vinylicmagnesium chlorides have been designated as such. When the magnesium chloride compounds are prepared in the presence of compound Q, defined herein, the vinylicmagnesium chloride compounds may take the form of a complex with compound Q, ViMgCl·nQ, wherein Vi and Q are as defined above and $n$ is a small indeterminate whole number in the order of 1, 2 or 3.

While the invention has been described with particular reference to specific embodiments, it is to be understood that it is not limited thereto but is to be construed broadly and restricted solely by the scope of the appended claims.

What is claimed is:

1. A process for preparing vinylicboron compounds which comprises reacting a vinylicmagnesium chloride wherein the vinylic group has up to 8 carbon atoms and is selected from the class consisting of alkenyl, cycloalkenyl, and aralkenyl groups, with a boron reactant having the formula:

$$R_aBX_{3-a}$$

wherein R is a radical selected from the class consisting of alkyl, cycloalkyl, alkandiyl, cycloalkandiyl, alkenyl, alkadienyl, cycloalkenyl, alkynyl, cycloalkadienyl, aryl and aralkyl radicals, X is a radical selected from the class consisting of halogen, alkoxy and aryloxy radicals, and $a$ has the values 0 to 2; said reaction being carried out in the presence of a cyclic ether selected from the class consisting of tetrahydrofuran, tetrahydropyran, dihydropyran, 2-methyltetrahydrofuran, 2-ethoxytetrahydropyran, tetrahydrofurfuryl ethyl ether and N-alkylmorpholines.

2. A process according to claim 1 wherein the cyclic ether is tetrahydrofuran.

3. A process according to claim 1 wherein the boron reactant has the formula $BX_3$.

4. A process according to claim 3 wherein $BX_3$ is boron trichloride.

5. A process according to claim 3 wherein $BX_3$ is triphenyl borate.

6. A process according to claim 3 wherein $BX_3$ is trialkyl borate.

7. A process according to claim 1 wherein the vinylicmagnesium chloride has the formula $CH_2{=}CH{-}MgCl$.

8. A process according to claim 7 wherein the cyclic ether is tetrahydrofuran.

9. A process according to claim 8 wherein the boron reactant has the formula $BX_3$.

10. A process according to claim 9 wherein $BX_3$ is boron trichloride.

11. A process according to claim 9 wherein $BX_3$ is trialkyl borate.

12. A process according to claim 9 wherein $BX_3$ is triphenyl borate.

References Cited in the file of this patent

UNITED STATES PATENTS

| | | |
|---|---|---|
| 2,346,155 | Denison et al. | Apr. 11, 1944 |
| 2,413,718 | Lincoln et al. | Jan. 7, 1947 |

OTHER REFERENCES

Kharasch et al.: "Grignard Reactions of Non-metallic Substances," Prentice-Hall, Inc. (1954), pp. 36–37, 40, 49, 53–56.